Dec. 13, 1938.  T. C. McVEAGH  2,140,329
WHEEL SECURING DEVICE
Filed Dec. 20, 1935  4 Sheets-Sheet 1

WITNESSES

INVENTOR
Thomas C. McVeagh.
BY
ATTORNEYS

Dec. 13, 1938.   T. C. McVEAGH   2,140,329
WHEEL SECURING DEVICE
Filed Dec. 20, 1935   4 Sheets-Sheet 2
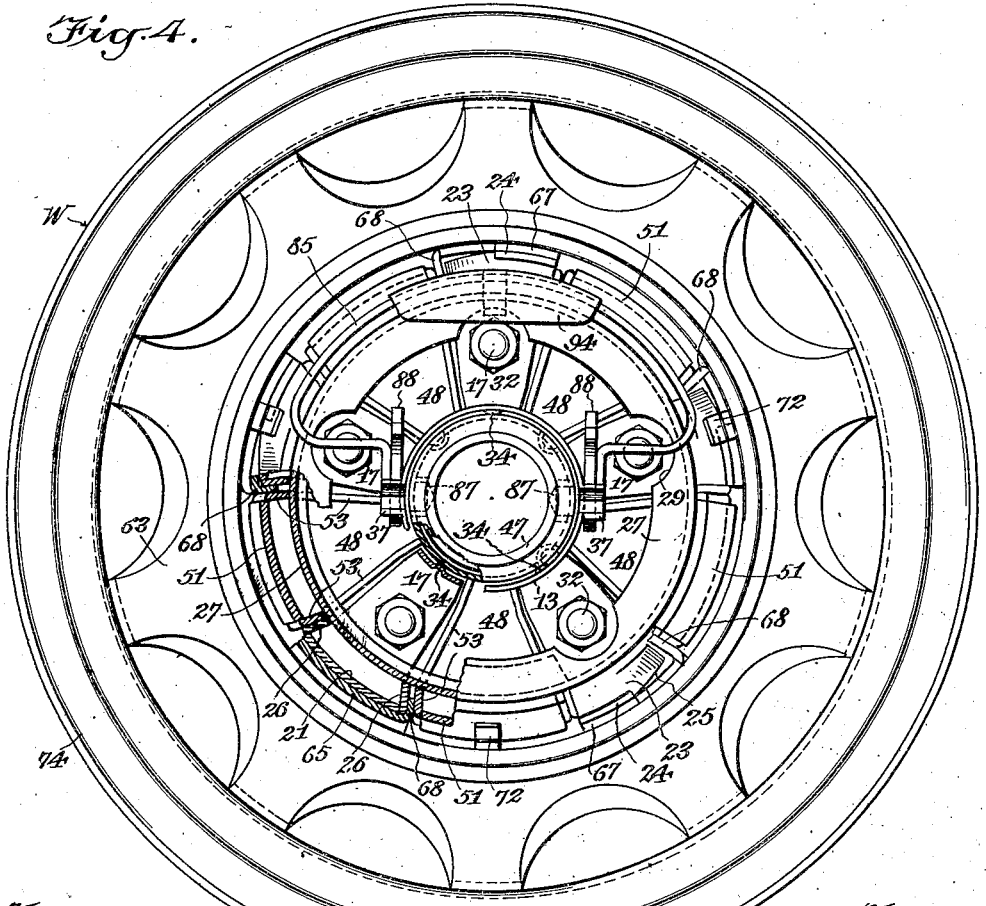
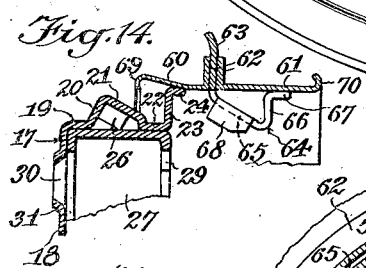
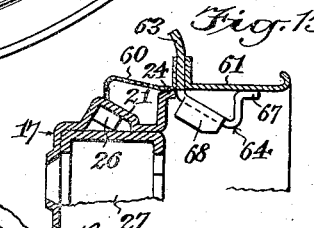
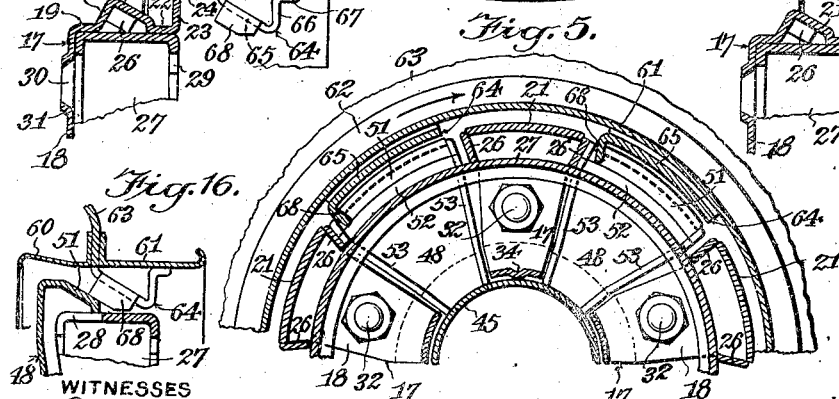
WITNESSES
INVENTOR
Thomas C. McVeagh.
BY
ATTORNEYS Dec. 13, 1938.  T. C. McVEAGH  2,140,329
WHEEL SECURING DEVICE
Filed Dec. 20, 1935  4 Sheets-Sheet 3
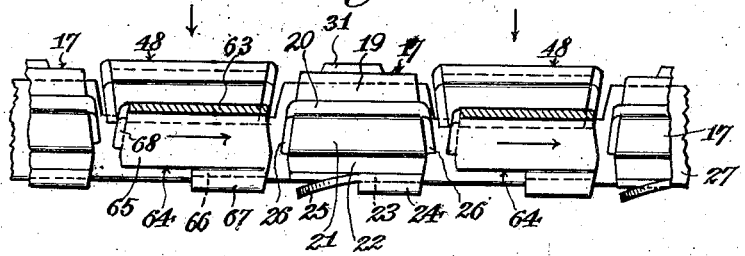
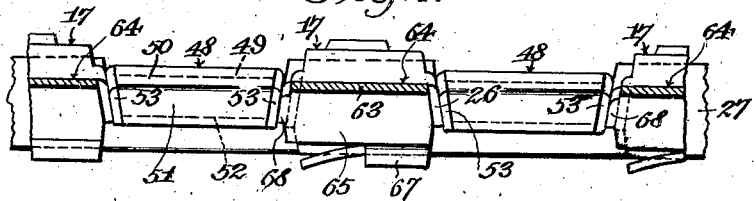
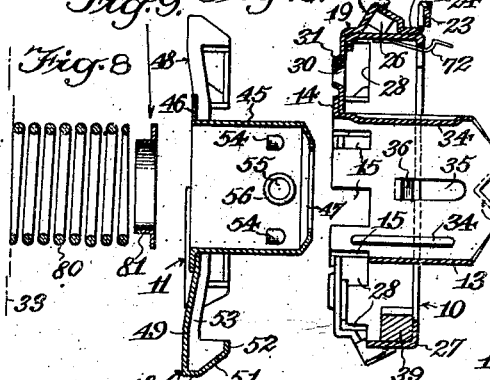
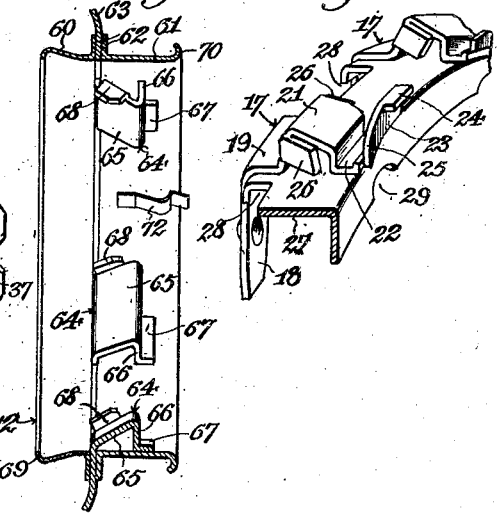
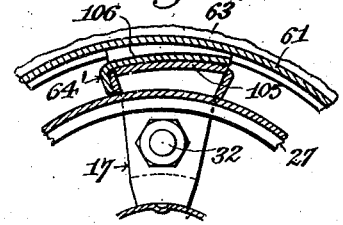
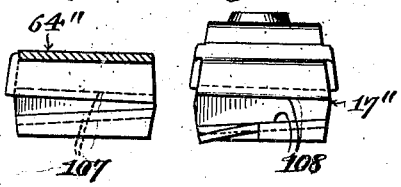
WITNESSES
INVENTOR
Thomas C. McVeagh.
BY
ATTORNEYS Dec. 13, 1938.  T. C. McVEAGH  2,140,329
WHEEL SECURING DEVICE
Filed Dec. 20, 1935  4 Sheets-Sheet 4

WITNESSES

INVENTOR
Thomas C. McVeagh
BY
Anderson + Liddy
ATTORNEY

Patented Dec. 13, 1938

2,140,329

UNITED STATES PATENT OFFICE 2,140,329

WHEEL SECURING DEVICE

Thomas C. McVeagh, Honolulu, Territory of Hawaii

Application December 20, 1935, Serial No. 55,476

9 Claims. (Cl. 301—9)

This invention relates to demountable or detachable vehicle wheels, and has especial reference to a device or means for detachably securing a vehicle wheel in operative position.

The present invention is in the nature of an improvement over the invention disclosed in Letters Patent of the United States No. 2,026,586, issued January 7, 1936.

The present invention, like that in the aforesaid patent, is designed and adapted for attaching or securing a wheel and for detaching or dismounting the wheel without the use of extra tools or implements.

An object of this invention is the provision of improvements, whereby the mounting, securing, releasing and dismounting of a vehicle wheel will be greatly facilitated.

A further object of this invention is the provision of improvements in a detachable wheel securing means, whereby the wheel will be effectually secured in operative position due to prevention of relative axial and rotational movement of the interacting or interengaging parts on inner and outer hub members.

A further object of the invention is the provision of a securing device which is designed and adapted to be used advantageously in conjunction with a vehicle wheel of the disk and wire spoke types including a hub housing which encloses and therefore protects the parts of the device, said housing having a removable cap which cannot be replaced until the wheel is secured in operative position, thereby assuring safety.

A further object of the invention is the provision of an anti-wheel-theft device in conjunction with the removable cap.

A further object of the invention is to provide a device of the indicated character having certain main parts which may be stamped, bent and formed from malleable metal according to economical methods of manufacture.

The nature of the invention and its distinguishing features and advantages will appear when the following specification is read in connection with the accompanying drawings, in which—

Fig. 4 is a side view of the wheel and securing device, the latter being partly shown in section, the wheel being secured;

Fig. 5 is a fragmentary section of the securing device, illustrating the wheel element orientated in the plane of rotation for engagement with the carrier element, and the securing element in its releasing position;

Fig. 6 is a diagrammatic view illustrating the relation of carrier element, securing element, and the wheel element, corresponding to the showing in Fig. 5;

Fig. 7 is a view similar to Fig. 6, but illustrating the manner in which the wheel element is secured;

Figure 20:
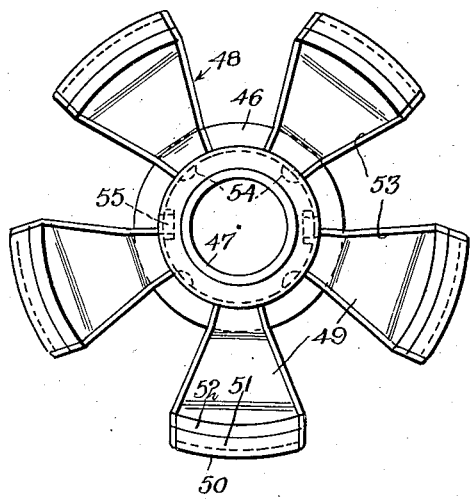
Figure 21:
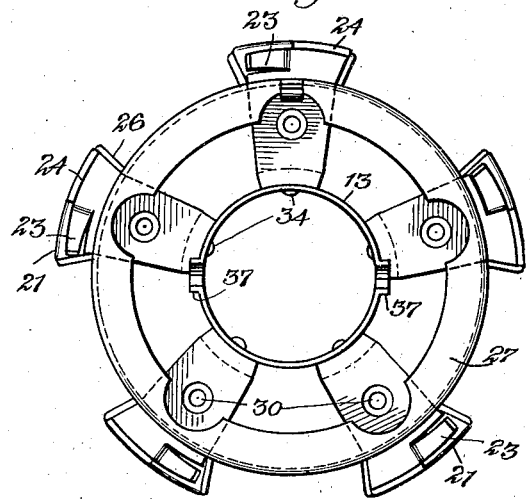
Figure 22:
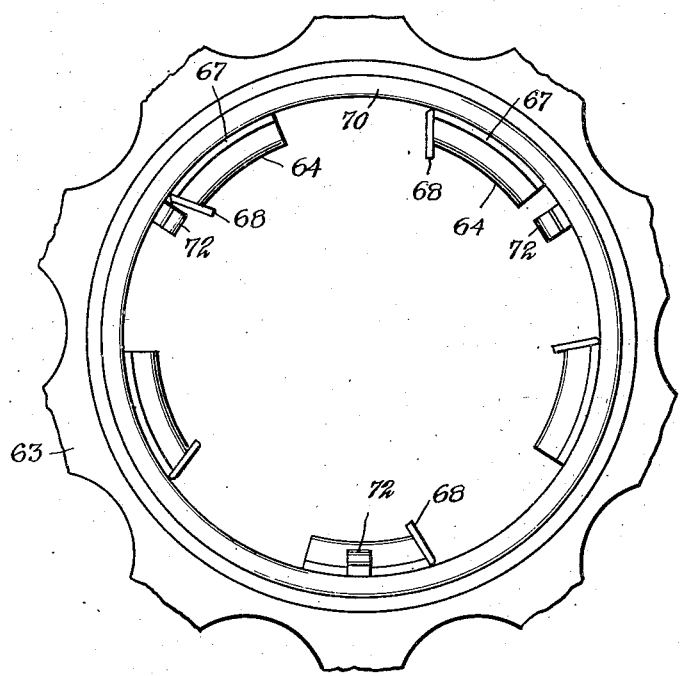

Figs. 8 to 12, inclusive, are sectional views of the compression spring, spring ring, securing element, carrier element, and wheel element, respectively, of the securing device;

Fig. 13 is a fragmentary perspective view showing certain features of the carrier element;

Fig. 14 is a fragmentary section of the carrier element and wheel element of the securing device, showing the wheel element being orientated in the plane of rotation;

Fig. 15 is a view similar to Fig. 14, but showing the wheel element orientated in the plane of rotation;

Fig. 16 is a view similar to Fig. 14, but showing the wheel element orientated in the axial plane as well as the plane of rotation;

Fig. 17 is a fragmentary section of modification of a securing sector of the wheel element; wheel elements;

Fig. 18 is a section showing a further modification of a securing sector of the wheel element; and Fig. 19 is an elevation showing a further modification of a securing sector of the carrier element which is engageable with the form of securing sector shown in Fig. 18;

Fig. 20 is a front view of the structure shown in Fig. 10;

Fig. 21 is a front view of the structure shown in Fig. 11;

Fig. 22 is a front view of the structure shown in Fig. 12.

Referring now more particularly to the drawings, it will be apparent that the device of the present invention includes three main elements consisting of a carrier element 10, a securing element 11, and a wheel element 12. The elements 10, 11 and 12 are shown most clearly in Figures 11, 10 and 12, respectively. The elements 10, 11 and 12, for the sake of cheapness, are pressed or stamped, bent and formed from malleable sheet material.

The carrier element 10 includes a tubular cylinder or hub member 13 having sector-shaped flanges 14 extending radially outward on the inner end thereof, there being five flanges 14, which are placed equidistantly, and said hub member 13 has notches 15 therein and between the said flanges 14. A radial securing sector 17 is integral with each of the flanges 14. Each sector 17 consists of a radial web portion 18 and relatively angularly disposed circumferential portions 19, 20, 21, 22, 23 and 24, respectively, in continuation of each other. The portion 19 is in continuation of the outer end of the web portion 18 and the inner end of said portion 18 is welded to the related flange 14. The portion 21 is inclined outwardly and toward the axis of the hub member 13, while the portion 23 in the present instance is disposed perpendicular to the said axis, although said portion 23 may be inclined with respect thereto. The portion 24 is in the nature of a flange on the outer end of the portion 23. If desired, the flange 24 may be omitted. The portion 23, for a part of its width, curves outwardly in one direction and the circumferential edge thereof curves or dips toward the axis of the hub member 13, as at 25. The flange portion 24 is only a portion of the width of the portion 23. The portion 20 has wings 26 integral therewith which constitute abutments at opposite sides of the sector 17. A flanged annular member 27 is welded to the circumferential portions 19 and 22 of the sectors 17 in order to give strength and rigidity thereto by tying them to each other. The annular member 27 has five notches 28 therein which are spaced equidistantly and the outer flange of the member 27 has five notches 29 therein. The web portion 18 of each of the sectors has a hole 30 therein surrounded by a conical boss 31. Each hole 30 receives a bolt 32 for the purpose of securing the carrier element 10 to a brake drum 33, indicated in dot-and-dash lines in Figures 1 and 2, so that the carrier element 10 will rotate with the brake drum 33. The hub member 13 has longitudinally extending ribs 34 on the inside thereof, there being three in the present instance, in line with the web portions 18, respectively. The hub member 13 has longitudinally extending slots 35 therein which are diametrically opposite each other, the material of the hub member being extended to provide an L-shaped stop 36 at one end of the slot and a stop 37 beyond the outer end of the slot in alignment therewith, said stop providing a V-shaped fulcrum on the outer end of the hub member 13. The annular member 27 has welded therein a counterbalancing weight 39. The functions and purposes of the features of the carrier element 10 hereinabove described will be hereinafter fully set forth.

The securing element 11 includes a tubular cylinder or hub member 45 having an outturned flange 46 on its inner end and an inturned flange 47 on its outer end. Radially extending securing sectors 48, integral with the flange 46, are provided thereon. In the present instance there are five sectors 48, which are spaced equidistantly. Each of the sectors 48 consists of a radial web portion 49 and relatively angularly disposed circumferential portions 50, 51 and 52, respectively, in continuation of each other, the portion 50 being in continuation of the outer end of the web portion 49. A flange 53 is in continuation of the portions 49, 50, 51 and 52 at each side of the sector 48, in order to give strength and rigidity thereto. The inner end of the web portion 49 of each sector 48 is welded to the flange 46. The hub member 45 has stops 54 on the inside thereof, said stops being developed from the material of the hub member 45. Any suitable number of stops 54 may be provided in axial alignment. The hub member 45 has holes 55 therein diametrically opposite each other near the outer end, and a boss 56 formed from the material of the hub member surrounds each of the holes 55 on the inside of the hub member 45. The hub member 45 is slidable or movable within the hub member 13 of the carrier element 10, and said hub member 45 is retained coaxial with the hub member 13 by the ribs 34, which reduce friction between the hub members 13 and 45 to the minimum. The sectors 48 of the securing element 11 are receivable between adjacent sectors 17 of the carrier element 10, by reason of the spaces between the flanges 14 and also by reason of the notches 15 in the hub member 13 and the notches 28 in the annular member 27. The functions and purposes of the other features of the securing element hereinabove described will be set forth hereinafter.

The wheel element 12 consists of hub shell or housing sections 60 and 61, each of which has a flange 62 welded to a web or disk section 63 forming a part of the wheel. Radial securing sectors 64 are formed from the material of the web section 63, and are disposed on the inside of the hub housing or shell formed by the sections 60 and 61. The sectors 64 are five in number and are spaced equidistantly so as to be engageable with the sectors 17 of the carrier element 10 and also to be engageable with the sectors 48 of the securing element 11. Each sector 64 consists of relatively angularly disposed circumferential portions 65, 66 and 67, respectively, in continuation of each other, the portion 65 being in continuation of the web section 63. The angularity of the portions 65, 66 and 67 corresponds with the angularity of the portions 21, 23 and 24 of the sectors 17 of the carrier element 10. The portion 65 of each sector 64 has a wing 68 integral therewith on one end. The wing 68 extends inwardly with respect to the axis of rotation and constitutes an abutment for the purpose of transmitting the rotary motion and the power effort in a manner to be explained. The sectors 64 are of such size as to readily pass between adjacent sectors 17 of the carrier element 10 by axial movement of the wheel, designated generally by the reference character W, either in attaching the wheel or in detaching the same. The portion 67 of each sector 64 is not coextensive with the portion 66, but is approximately one-half the circumferential length thereof and approximately equal to each of the portions 24 of the sector 17. The housing section 60 is substantially frusto-conical and has an inwardly rolled circular edge 69, whereas the housing section 61 has an outwardly rolled edge 70. The hub housing or shell also includes a circular cap 71 which is detachably held in place by snap springs 72 secured to the housing section 61 on the inside thereof. The edge portions of the web section 63 have secured thereto, as at 73, a tire-carrying rim 74. The rolled edge 69 of the housing section 60 is adapted for contactual engagement with a ring 75 of resilient material, secured to the drum 33, for the purpose of excluding dust, dirt and the carrier element 10. The handle 85 is then swung to its securing position, and as this is being done the spring 80 reacts on the ring 81, and through the intervention of the stops 54 and boss 56 on the hub member 45 of the securing element 11, the latter will be moved axially outward into a securing position. The sectors 48 of the securing element will be brought into the spaces between the sectors 17 of the carrier element, and the opposite sides of each sector 48 will bear as follows. One side of each sector 48 will be bearing against the wing abutment 68 of an adjacent sector 64, and the other side of the sector 48 will be bearing against the adjacent wing abutment 26 of an adjacent sector 17 of the carrier element 10. The wheel element 12, and therefore the wheel, will now be securely held not only against relative axial movement with respect to the carrier element 10, but also will be held against relative rotational movement with respect to said carrier element 10. In this manner the wheel will be securely attached to rotate with the brake drum 33. When the handle 85 is moved into its securing position, the finger 92 will engage the clip 93 and this will be supplemented by the engagement of the stops 37 in the notches 91 in the cams 88. The handle 85 will thus be held against unintentional movement. The stops 36 may be encountered by the cams 88 when the wheel is secured, thereby positively preventing unintentional movement of the securing element 11 to the releasing position due to any external force tending to move the securing element 11 toward its releasing position against the action of the spring 80. This is used for the purpose of safety in an emergency. It will be obvious that by swinging the handle 85 to the releasing position, a reverse operation may be performed for the purpose of releasing and demounting or detaching the wheel.

When the wheel is secured by the interengagement of the parts as hereinabove described, the rotary motion and power effort will be transmitted as follows. From the brake drum 33 to the carrier element 10 by virtue of the bolts 32, from one side of each sector 17 to one side of the adjacent sector 48 of the securing element, and from the other side of the sector 48 to the abutment 68 of the adjacent sector 64 of the wheel element 12. In other words, the sectors 17 transmit motion and power to the sectors 48, which in turn transmit the motion and power to the sectors 64 when the brake drum 33 is rotating in a clockwise direction. When the brake drum is rotating in a counterclockwise direction the motion and power will be transmitted from the sectors 17 directly to the sectors 64.

Attention is called to the fact that the removable cap 71 of the hub housing cannot be replaced until the wheel is secured in operative position while the handle 85 is in the releasing position. This will always cause an operator to swing the handle 85 to the securing position after the wheel is in position to be secured. This feature serves as a safety warning.

By providing the counterbalancing weight 39 on the carrier element 10 at one side of the axis of rotation, because of the handle being disposed on the other side of said axis there will be a perfect balance of the parts about said axis, thereby eliminating any unnecessary vibration and improper rotational movement of the wheel.

In Fig. 18 there are shown modifications of the securing sectors of the carrier and wheel elements 10 and 12, respectively, there being shown by way of example, in engagement with each other, one securing sector 17' of the carrier element and one securing sector 64' of the wheel element. These sectors embody portions 105 and 106, respectively, which provide complemental contact surfaces which are eccentric to the axis of rotation of the wheel, and the opposite side surfaces of said portions 105 and 106 being parallel to each other.

In Fig. 19 there is shown a further modified form of wheel element securing sector 64'' which is engageable with a modified complemental carrier element securing sector 17'' shown in Fig. 20. These sectors embody portions which provide complemental radial contact surfaces 107 and 108, respectively, the former contacting the latter respectively, the surfaces 107 being in converging relation to each other, and the surfaces 108 being likewise in a converging relation to each other.

It is to be understood that the invention is not restricted to the precise arrangement of parts shown and described, as details of constructions may be modified and rearranged without departing from the spirit of the invention, the scope of which is limited only by the terms of the appended claims.

I claim:

1. In a detachable wheel securing device, a hub structure comprising a hub member having a plurality of circumferentially spaced radially extending securing sectors, each of said sectors consisting of a radial web portion merging successively into a base flange extending parallel to the axis of the hub, an upstanding flange arranged at an angle to a radial line, an inclined seat portion, a flange depending radially inwardly from said seat portion, a second base flange extending substantially parallel to the axis of the hub, and a flange extending radially outwardly but at a slight angle to a true radial line, a hub housing constituting a part of a wheel, said housing having equidistantly spaced radial sectors, there being one for each of said hub sectors, and each housing sector having portions corresponding to the aforesaid portions of the hub sectors which engage therewith, to prevent relative axial movement of the housing with respect to the hub, and means movable into engagement with said hub and housing sectors when they are engaged as aforesaid, to prevent relative rotational movement of the housing with respect to the hub, said means being movable out of engagement with said sectors so that said wheel may be dismounted from the hub.

2. In a detachable wheel securing device, a hub having equidistantly spaced radial sectors, each of said sectors consisting of a radial web portion, and relatively angularly disposed circumferential portions in continuation of each other, and one of said circumferential portions being integral with said web portion, a hub housing constituting a part of a wheel, said housing having equidistantly spaced radial sectors, there being one for each of said hub sectors, and each housing sector having portions corresponding to the aforesaid circumferential portions of the hub sectors which engage therewith and with the radial hub portions of the hub to prevent relative axial movement of the housing with respect to the hub, and means movable into engagement with said hub and housing sectors when they are engaged as aforesaid, to prevent relative rotational movement of the housing with respect to the hub, said means being movable out of engagement with other foreign substance from entering the housing or shield.

Attention is now called to the fact that the sectors 17, 48 and 64 are so proportioned and of such geometrical shapes that clearance is provided to facilitate their interengagement and disengagement while affording the necessary contact with each other to prevent relative rotational movement of the wheel element 12 with respect to the carrier element 10, and also to prevent axial movement of the wheel element 12 with respect to the carrier element 10. In order to obtain an effectual interengagement or interaction of the sectors, 17, 48 and 64, the contacting portions 26 of the sectors 17 diverge outwardly with respect to each other and converge toward each other with respect to the axis of rotation. The contacting portions provided by the flanges 53 of the sectors 48, at the outer ends thereof, converge outwardly with respect to each other, and diverge with respect to each other with reference to the axis of rotation. The contacting portions 68 of the sectors 64 have the same coaxial angularity as the contacting portions 26 and 53 of the sectors 17 and 48 respectively.

Figures 1, 2, 3:
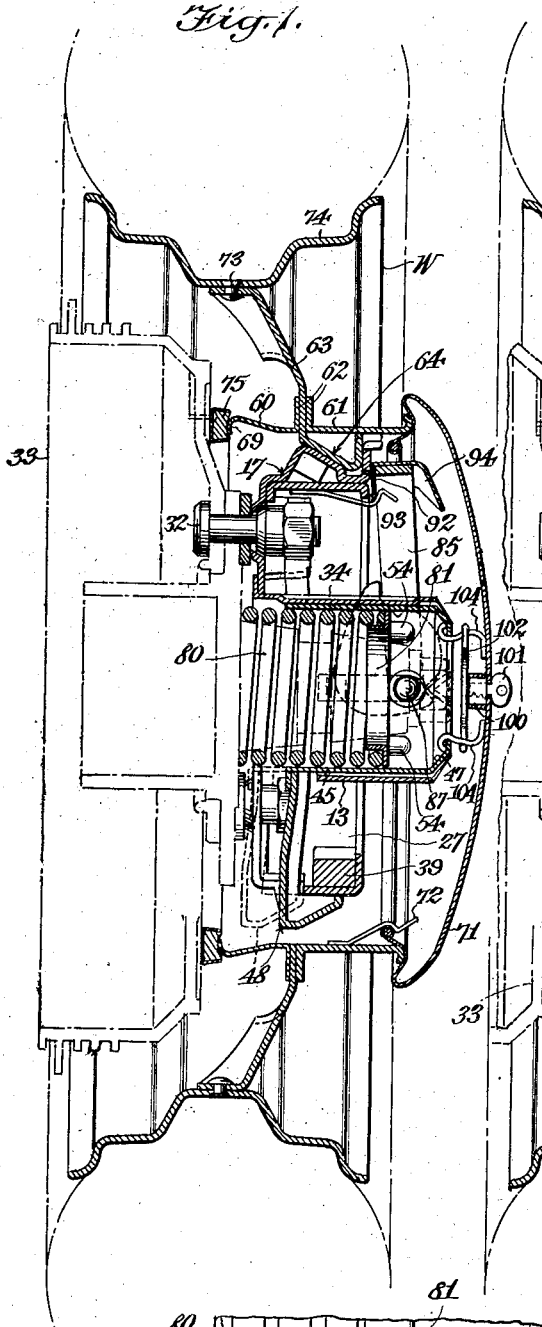
Figure 1 is a section of a vehicle wheel embodying the features of the invention, the wheel being shown secured.
Fig. 2 is a view similar to Fig. 1, but showing the securing device released and the wheel detached.
Fig. 3 is a detail section showing certain features of the manually operable means for securing and releasing the wheel.

As above stated, the carrier element 10 is bolted to the brake drum or other rotary driving part, by bolts 32 and their nuts and suitable spacers, as shown most clearly in Figs. 1 and 2. The hub member 13 and the circumferential or arcuate portions 19—24 will be coaxial with respect to the axis of rotation. Before the carrier element 10 is bolted to the brake drum, the securing element 11 will be associated therewith with the hub member 45 of the latter extending into the hub member 13 of the former. A coil compression spring 80 surrounds the hub of the brake drum and one end of said spring is in contact with the brake drum and its other end is in contact with a ring 81 made of stock L-shaped in cross section. The ring is held in engagement with the stops 54 on the inside of the hub member 45. The spring 80 functions to cause the outward axial movement of the securing element 11 to its securing position, and is yieldable to allow the securing element 11 to be moved to a releasing position as shown in dotted lines in Fig. 1 and in full lines in Fig. 2; the securing position of said element 11 being shown in full lines in Fig. 1. It will also be observed that the ring 81 is engageable with the boss 56, as shown in Fig. 3, to limit its outward movement.

Manually operable means is employed to move the securing element 11 into a releasing position against the action of the spring 80, and also to retain the securing element 11 in the releasing position so that the wheel may be mounted and demounted, and said means also allows the securing element to move under the action of the spring 80 to its securing position in order to secure the wheel for use. The said means consists of a substantially U-shaped handle 85, which provides side portions 86. Each of the side portions 86 carries an arbor or pivot 87 on its inner end and said end also has secured thereto a cam 88 having a bill 89 and V-shaped notches 90 and 91, respectively, in its periphery adjacent the bill 89. The arbors or pivots 87 are receivable in the slots 35 and the holes 55, respectively, in the hub members 13 and 45, said slots 35 and holes 55 being in registry with each other. The handle 85 is thus mounted for swinging or pivotal movement. The cams 88 are disposed on the outside of the hub member 13, each cam 88 being positioned between the stops 36 and 37 on the related side of the hub member 13. When the handle 85 is swung to a releasing position in which it is disposed parallel to the axis of rotation of the wheel, the releasing position of the handle as shown in Fig. 2, the related stop 37 will be engaged in the notch 90 in the cam, thus preventing unintentional movement of the handle, and, at the same time, retaining the securing element 11 in its releasing position. It will be apparent that the bill 89 of each cam engages the related stop 37 to limit the movement of the handle 85 to its releasing position. The bill 89 is not absolutely necessary and may be omitted. The handle 85 may be swung to a securing position in which it will be disposed approximately at a right angle to the axis of rotation of the wheel, as shown in Fig. 1. This will allow the spring 80 to function to cause the movement of the securing element 11 to its securing position. When the handle 85 is in its securing position, the stops 37 will be engaged, respectively, in the notches 91 in the cams 88 to prevent unintentional movement of the handle 85. In order to more securely retain the handle 85 in its securing position, the handle is provided with a finger 92 engageable with a spring clip 93 secured to the annular member 27 of the carrier element 10. The handle may be provided with a hand-hold 94 for conveniently moving the handle into its releasing position. If desired, the finger 92 may be formed integral with the hand-hold 94 which is welded to the portion of the handle joining the side portions 86.

When the securing element 11 is moved into its releasing position by moving the handle 85 into the position paralleling the axis of rotation, as shown in Fig. 2, the wheel may be demounted or detached, and if demounted or detached may be mounted and secured. When it is desired to mount and secure the wheel, the following operations are performed. The wheel is lifted and moved toward the brake drum 33, so as to engage the frusto-conical housing section 60 with the flanges 24 on the uppermost sectors 17 of the carrier element 10, as shown in Fig. 14. The wheel is then pushed axially toward the brake drum. The sectors 64 of the wheel element encountering, respectively, the flanges 24 of the sectors 17, will orientate the wheel in the plane of rotation, as shown in Fig. 15. The wheel may then be turned in either direction until the sectors 64 are in registry with the spaces between the sectors 17 of the carrier element, whereupon the wheel may be moved farther axially until the abutments 26 contact with the inclined circumferential portions 51 of the sectors 48 of the securing element, as shown in Fig. 16. The wheel remains in the plane of rotation and now must be turned clockwise which will engage the sectors 64 of the wheel element with the sectors 17, respectively, of the carrier element 10 causing the wheel to be mounted in its final position coaxial with the carrier element 10. This will bring the wing abutments 68 of the sectors 64 in contact with the outer ends of the sectors 17, and the portions 65, 66 and 67 of each of the sectors 64 will bear on the corresponding portions 21, 23 and 24, respectively, of the engaged sector 17. By reason of the outwardly curved and inwardly dipped surfaces 25 of the sector 17, the engagement of the sectors 64 with the sectors 17, respectively, will be facilitated. The wheel will then be orientated in an axial plane, as well as the plane of rotation, and will be effectually prevented from having relative axial movement with respect to said sectors so that said wheel may be dismounted from the hub.

3. In a detachable wheel securing device, a hub having spaced radial sectors, each of said sectors embodying relatively angularly disposed circumferential portions, a hub housing constituting a part of a wheel, said housing having spaced radial sectors, there being one for each of said hub sectors, each housing sector having portions corresponding to the aforesaid circumferential portions of the hub sectors which engage therewith, to prevent relative axial movement of the housing with respect to the hub, each housing sector having an abutment projecting from one side of one of its circumferential portions which is engageable with its hub sector, and a securing element movable into engagement with said abutment of each housing sector and with each hub sector when the sectors are engaged, to prevent relative rotational movement of the housing with respect to the hub, said element being movable into a position so that said wheel may be dismounted from the hub.

4. In a detachable wheel securing device, a hub structure comprising a hub member, spaced radial securing sectors integral with said hub member, each of said sectors consisting of a radial web portion, and relatively angularly disposed circumferential portions in continuation of each other, and one of said circumferential portions being integral with said web portion.

5. In a detachable wheel securing device, a hub structure comprising a hub member, spaced radial securing sectors integral with said hub member, each of said sectors consisting of a radial web portion, and relatively angularly disposed circumferential portions in continuation of each other, one of said circumferential portions being integral with said web portion, and the other circumferential portion having a circumferential flange.

6. In a detachable wheel securing device, a hub structure comprising a hub member, spaced radial securing sectors integral with said hub member, each of said sectors consisting of a radial web portion, relatively angularly disposed circumferential portions in continuation of each other and one of said circumferential portions being integral with said web portion, and an annular member secured to said sectors to give strength and rigidity thereto.

7. In a detachable wheel, a wheel web, annular parts secured to said web and forming a hub shell or housing, and spaced radial securing sectors integral with said web and disposed inside of said shell or housing.

8. In a detachable wheel, a wheel web, annular parts secured to said web and forming a hub shell or housing, and spaced radial securing sectors integral with said web and disposed inside of said shell or housing, each of said sectors consisting of relatively angularly disposed circumferential portions in continuation of each other.

9. In a detachable wheel, a wheel web, annular parts secured to said web and forming a hub shell or housing, and spaced radial securing sectors integral with said web and disposed inside of said shell or housing, each of said sectors consisting of relatively angularly disposed circumferential portions in continuation of each other, and an extension on one of said portions constituting means for holding the wheel in operative position and for transmitting the rotational motion and power to the wheel.

THOMAS C. McVEAGH.